US008472074B2

(12) United States Patent
Yabe

(10) Patent No.: US 8,472,074 B2
(45) Date of Patent: Jun. 25, 2013

(54) PRINTING APPARATUS AND PRINTING METHOD, AND PROGRAM THEREFOR HAVING FIRST FORM DATA AND SECOND FORM DATA

(75) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 12/357,893

(22) Filed: Jan. 22, 2009

(65) Prior Publication Data

US 2009/0190148 A1 Jul. 30, 2009

(30) Foreign Application Priority Data

Jan. 24, 2008 (JP) ................................ 2008-014209

(51) Int. Cl.
*G06F 15/00* (2006.01)

(52) U.S. Cl.
USPC ............ 358/1.9; 358/1.2; 358/1.18; 347/212; 347/100; 347/96; 399/407; 399/409; 399/410

(58) Field of Classification Search
USPC .................. 358/1.9, 1.2, 1.18; 347/212, 100, 347/96; 399/407, 409, 410
See application file for complete search history.

(56) References Cited

U.S. PATENT DOCUMENTS

| | | | | |
|---|---|---|---|---|
| 5,579,117 | A * | 11/1996 | Arsenault et al. | 358/296 |
| 7,119,932 | B2 * | 10/2006 | Sato et al. | 358/474 |
| 2005/0141942 | A1 * | 6/2005 | Someno | 400/76 |
| 2005/0185979 | A1 * | 8/2005 | Inoue et al. | 399/82 |
| 2009/0190148 | A1 * | 7/2009 | Yabe | 358/1.9 |
| 2009/0201548 | A1 * | 8/2009 | Hirakawa | 358/1.15 |

FOREIGN PATENT DOCUMENTS

| | | | |
|---|---|---|---|
| JP | 64-085766 | | 3/1989 |
| JP | 2004-223762 | | 8/2004 |
| JP | 2005-234395 | | 9/2005 |
| JP | 2009294634 | A * | 12/2009 |

* cited by examiner

*Primary Examiner* — Jacky X Zheng
(74) *Attorney, Agent, or Firm* — Fitzpatrick, Cella, Harper & Scinto

(57) ABSTRACT

The objective of the present invention is to provide a printing apparatus that can avoid difficulty in the folding of a print sheet that has been printed using clear toner. In order to achieve this objective of the present invention, a printing apparatus includes a storage unit for storing data which indicates positions to be printed by using a transparent color material on a print sheet according to a registration instruction and a synthesizing unit for synthesizing image which is printed by using non-transparent color material based on contents data and image which is printed by using transparent color material based on form data stored in the storage unit on a print sheet according to a synthesis instruction.

13 Claims, 9 Drawing Sheets

PRINTING APPARATUS AND PRINTING METHOD, AND PROGRAM THEREFOR HAVING FIRST FORM DATA AND SECOND FORM DATA

This application claims the benefit of Japanese Patent Application No. 2008-014209, filed Jan. 24, 2008, which is hereby incorporated by reference herein in its entirety.

BACKGROUND OF THE INVENTION

1. Field of the Invention

The present invention relates to a printing apparatus and a printing method for performing overlay printing by superimposing text data or image data with a form that has been created by a form creating apparatus, and a program therefor.

2. Description of the Related Arts

A presently in use printing technique employs a colorless, transparent toner (a clear toner (a transparent coloring material)).

Conventionally, when this printing technique and a common colored toner are employed, high quality printing can be provided using regular paper, or even using paper having a low unit cost, such as recycled paper.

Specifically, a clear toner is applied to the surface of a sheet on which an image, for example, has been printed, to change the glossiness of the paper. The clear toner is also employed to stably fix targeted objects to printing material, as described in Japanese Patent Laid-Open No. H01-085766 (1989) and Japanese Patent Laid-Open No. 2004-223762.

The technique disclosed in Japanese Patent Laid-Open No. H01-085766 (1989) is employed to perform a waterproofing process for the surface of a print medium, to prevent the deterioration of a printed image through the smearing or the bleeding of ink that has been discharged by the print head of an inkjet printing apparatus.

The technique disclosed in Japanese Patent Laid-Open No. 2004-223762 forms an ink acceptance layer on an appropriate portion of a sheet base material, such as a plastic film or a plastic card, to enable inkjet printing.

Further, some types of image forming apparatuses, such as copiers and printers, include functions such as stapling or punching, or paper folding for bookbinding, that are to be performed for a print sheet after printing has been completed.

Japanese Patent Laid-Open No. 2005-234395 discloses a technique according to which clear toner is pre-applied to a print sheet portion, wherein stapling or punching is subsequently to be performed, that may be assumed will easily be torn over time, and should, therefore, be physically reinforced to provide improved print sheet durability.

Furthermore, the following is a conventional technique for printing the above described text data and image data. Specifically, on a print sheet, printing areas are determined, based on which data are to be printed and the locations in which the data are to be printed, and then, during the printing process, a common color toner is applied only to the printing areas.

In addition, there is another printing technique according to which, for the printing of text data and of image data, a printing area for which a normal color toner is employed is designated on a print sheet.

However, when the printing result obtained by employing a clear toner is compared with the conventional printing result obtained by employing a normal color toner, the thickness of a print sheet is increased by a value equivalent to the thickness of the coating of the clear toner. Also, when a clear toner is applied to a portion of a print sheet that is to be turned over or folded, so that, a process, such as stapling or punching, is to be performed for the print sheet, and the thickness thereof is increased, ease in handling the print sheet is deteriorated. Furthermore, when the thickness of the print sheet is increased, post-printing processes, such as the paper folding process for bookbinding, are also adversely affected.

SUMMARY OF THE INVENTION

To resolve the above described problem, a printing apparatus according to the present invention comprises a storage unit for storing data which indicates positions to be printed by using a transparent color material on a print sheet according to a registration instruction and a synthesizing unit for synthesizing an image which is printed by using non-transparent color material based on content data and an image which is printed by using transparent color material based on form data stored in the storage unit on a print sheet according to a synthesis instruction.

In this invention, when overlay printing using clear toner is to be performed, automatically, use of the clear toner is locally canceled for an area that would be adversely affected were the clear toner used there. Specifically, the clear toner processing is canceled for an area for which stapling, punching, or paper folding is to be performed after printing has been completed. Therefore, when printing is performed using clear toner, a phenomenon such as the folding of a print sheet that would be difficult can be avoided, and for the print sheet, for which clear toner is used, the usability is improved.

Further features of the present invention will become apparent from the following description of exemplary embodiments (with reference to the attached drawings).

DESCRIPTION OF THE EMBODIMENT

First Embodiment

The configuration of a printing control system according to a first embodiment of the present invention will now be described while referring to a block diagram in FIG. 1.

So long as the functions of the present invention are performed, the printer control system may be provided as a single apparatus, or may be constituted by a plurality of apparatuses. Further, the present invention may also be applied for a system that is connected to a LAN (Local Area Network) and to a WAN (Wide Area Network) for performing the processing.

The printing control system of the first embodiment comprises a host computer 3000 and a printing apparatus 1500.

The host computer 3000 includes a CPU 1, a RAM 2 and a ROM 3.

Figure 1:
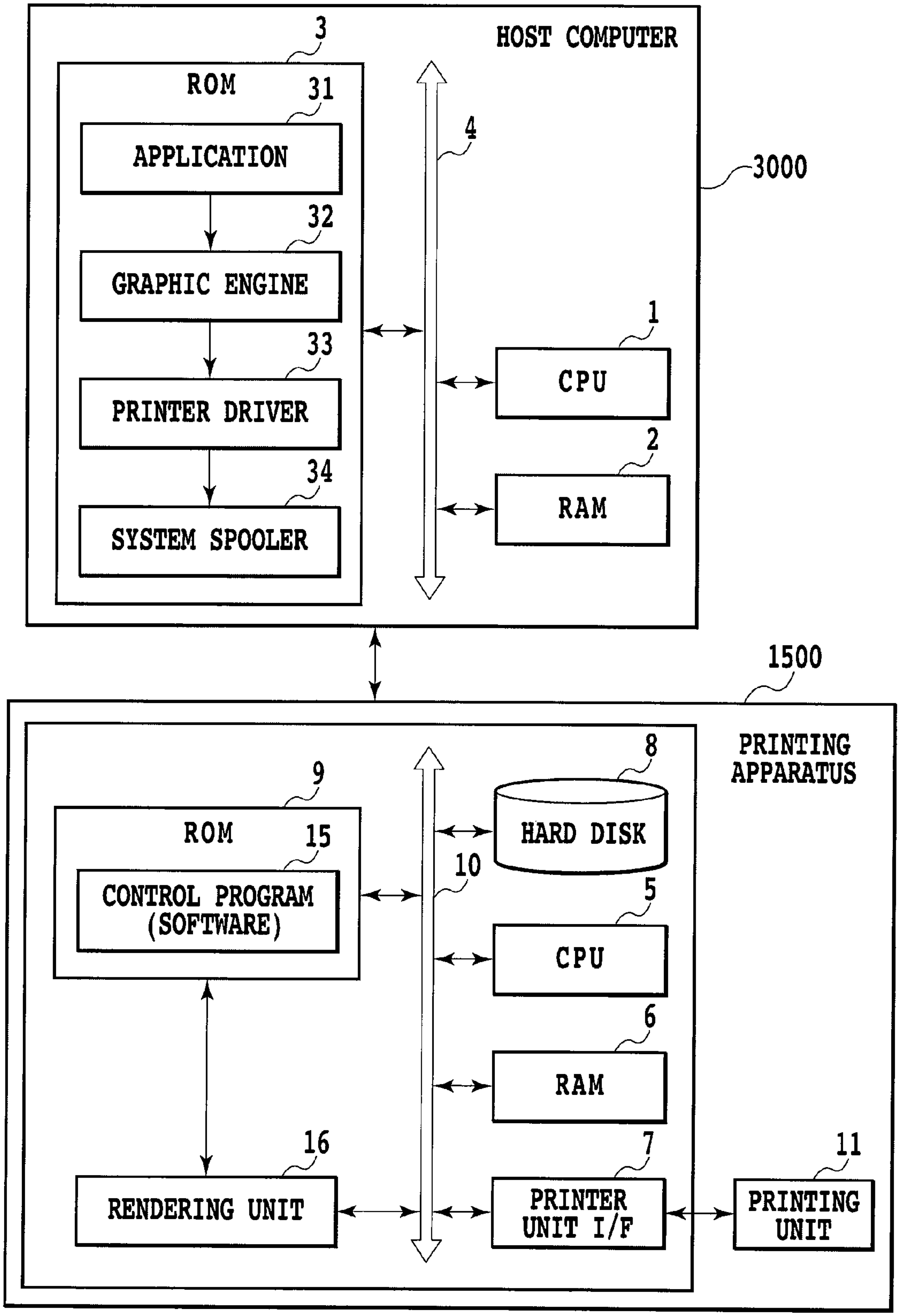
FIG. 1 is a diagram illustrating an overlay printing system according to a first embodiment of the present invention.

In FIG. 1, the CPU 1 of the host computer 3000 performs processes based on various programs stored in a program ROM of the ROM 3, and totally controls all the individual devices connected to a system bus 4.

The RAM 2 is employed as the main memory or as the work area for the CPU 1.

Further, based on commands entered by a user who employs, for example, a mouse cursor displayed on a CRT, the CPU 1 opens various types of registered windows, and performs a variety of data processes.

When a user desires to begin printing, the user opens a printing setup window and enters a setting for a printer and a setting for a printing method, to be employed by a printer driver, that includes a print mode.

An application program 31, a graphic engine 32, a printer driver 33 and a system spooler 34 are programs stored in the ROM 3, as shown in FIG. 1.

When the CPU 1 loads these programs into the RAM 2 and executes them, various relevant processes are initiated.

To simplify the content of the following explanation, the application 31, the graphic engine 32, the printer driver 33 and the system spooler 34 are regarded as the core elements for the performance of the processing.

That is, the following explanation will be given by employing the expression, "The application 31 performs the processing for . . . ."

It should be noted that, as will be apparent to one having ordinary skill in the art, the expression, "the application 31 performs the processing for . . . ," represents a statement that the application 31, in the ROM 3, has been loaded into the RAM 2, and that based on the application 31, the CPU 1 performs the processing for . . . ."

This definition is also applied for the graphic engine 32, the printer driver 33, the system spooler 34 and a control program (a software product) 15 that will be described later.

The printing apparatus 1500 is controlled by a printer CPU 5.

Based, for example, on a control program that is stored in a program ROM of a ROM 9, the CPU 5 of the printing apparatus 1500 outputs image data to a printing unit (a printer engine) 11 that is connected to a system bus 10 via a printer unit I/F (interface) 7. A control program (a software product) for the CPU 5 is also stored in the program ROM of the ROM 9.

The CPU 5 communicates with the host computer 3000 to transmit thereto internal data for the printing apparatus 1500.

A RAM 6 serves as either the main memory or the work area for the CPU 5.

A hard disk 8 is used for storing form data, for example.

In this embodiment, special hardware may be employed for a rendering unit 16.

Further, special hardware that handles only RGB or CMYK data may be employed for the rendering unit 16.

Or, the capability of the rendering unit 16 may be expanded to enable the handling of other additional data besides RGB or CMYK data.

The capability of the rendering unit 16 to process T data (transparent data) may be inhibited.

The control program 15 in FIG. 1 is a program group, and is also a virtual subject that is produced when the program group is executed by the CPU 1. Therefore, the operational scope of the program group can easily be expanded by designing a new program group. For example, the operational scope of the program group can easily be expanded to enable the handling of additional data (e.g., T data (transparent data)) other than RGB or CMYK data. In this embodiment, the control program 15 is designed so that its operational scope can be expanded to handle RGBT or CMYKT data.

The overlay printing function of the printing control system in FIG. 1 will now be described.

Figure 2:
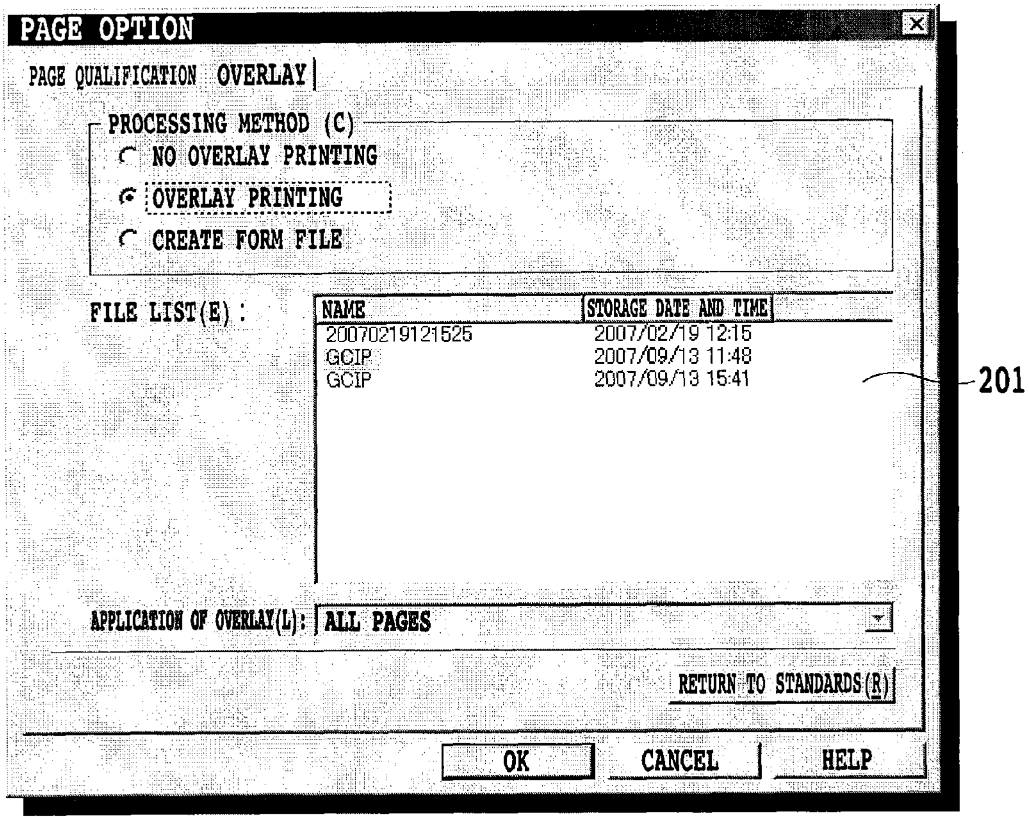
FIG. 2 is a diagram illustrating an example user interface used to designate overlay printing.
Figure 3:
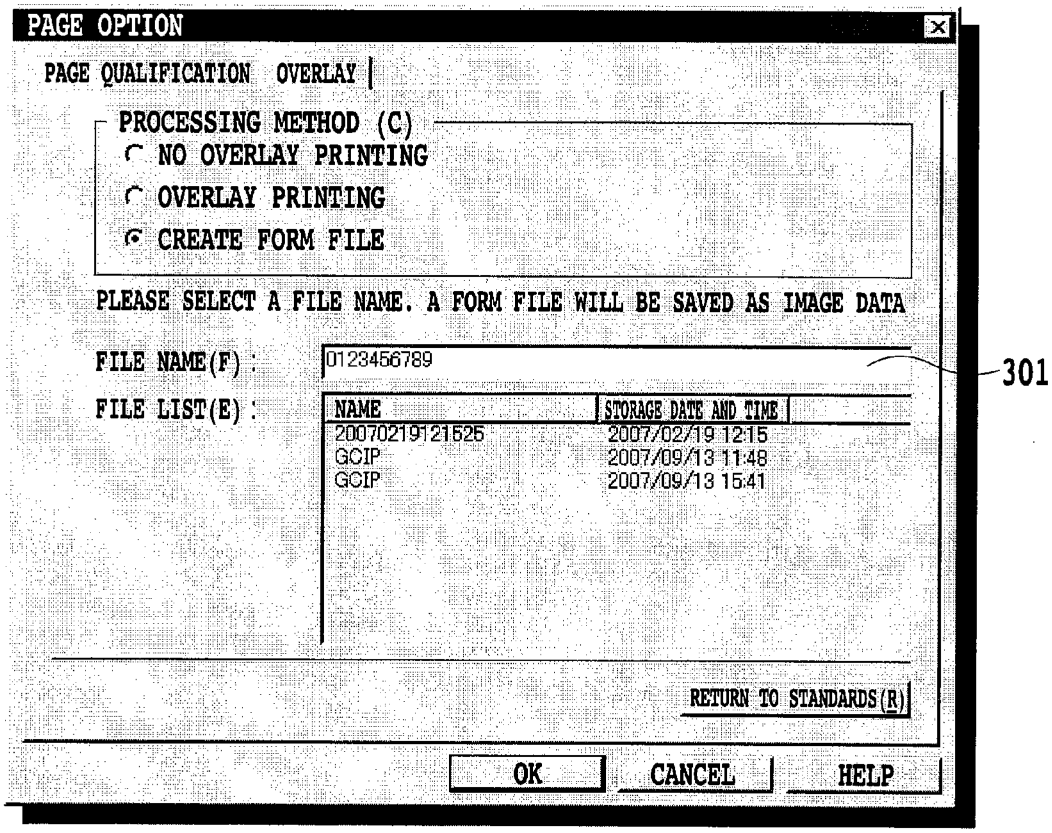
FIG. 3 is a diagram illustrating an example user interface used to designate creation of form data employed for overlay printing.

FIGS. 2 and 3 are diagrams showing example interfaces for selecting overlay printing. A user can employ these interfaces to designate for the control program 15 "No overlay printing", "Overlay printing" and "Create form file".

The example in FIG. 2 shows the user interface when "Overlay printing" has been designated. When the user has selected this setup and entered a printing instruction, the printer driver 33 performs the following process. The printer driver 33 obtains the file name of form data, stored on the hard disk 8 of the printing apparatus 1500, and the storage date and time. Then, the file name and the storage date and time for the obtained form data are displayed in a data display portion 201.

Figure 4:
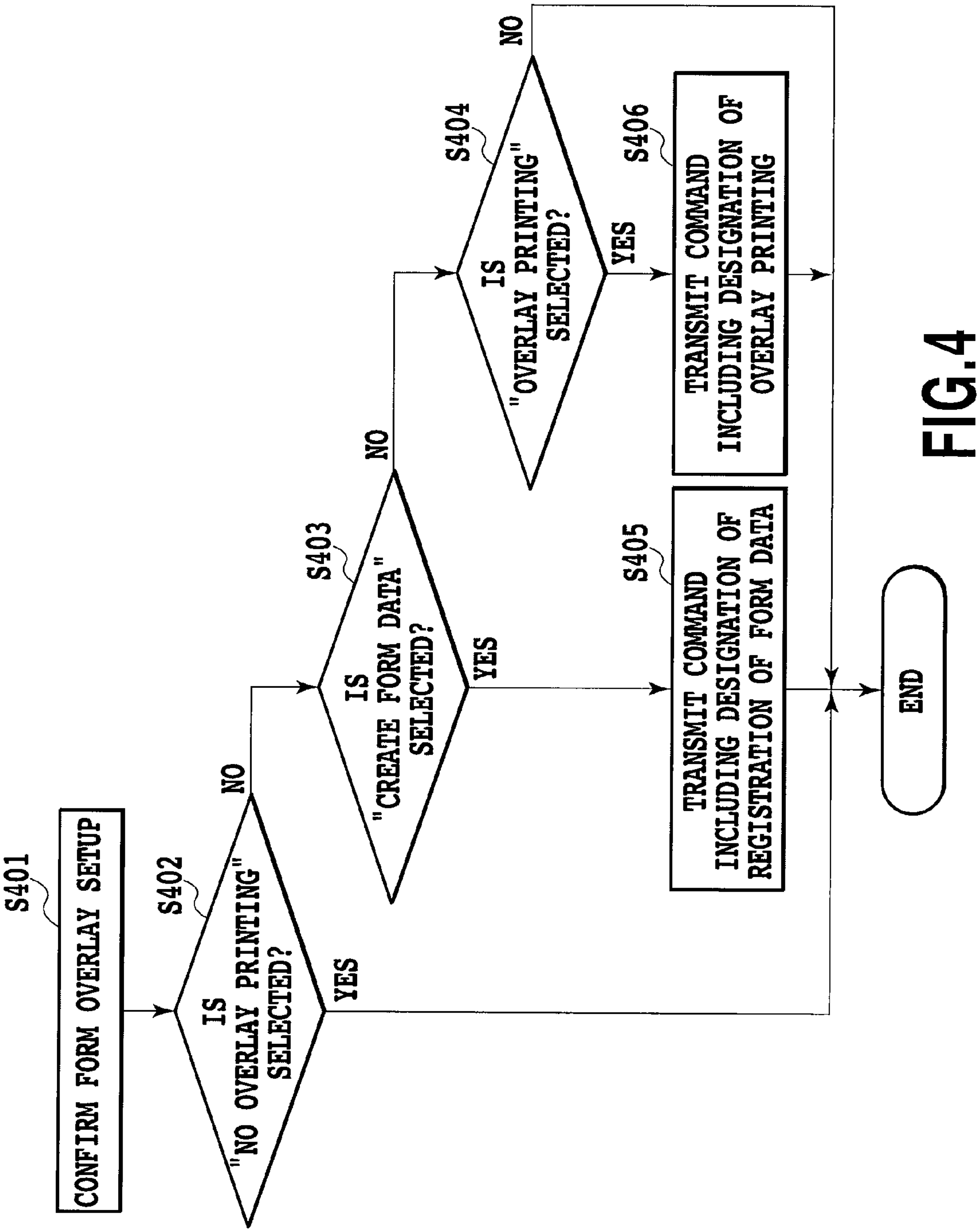
FIG. 4 is a flowchart showing the processing performed by a printer driver to initiate overlay printing.

FIG. 4 is a flowchart showing the overlay printing processing, performed by the printer driver 33, from the time a printing command is received from the graphic engine 32 until the overlay printing is initiated.

At step S401, the printer driver 33 obtains the user designated setup data by employing the interface shown in FIG. 4. The setup data obtained at step S401 include: the overlay method; the file name and the storage date and time for form data stored on the hard disk 8 of the printing apparatus 1500; and a file name for form data to be created.

At step S402, the printer driver 33 determines whether "No overlay printing" is included in the overlay setup obtained at step S401.

When it is determined at step S402 that "No overlay printing" was selected, the processing is terminated.

When it is determined at step S402 that "No overlay printing" was not selected, the processing advances to step S403.

At step S403, the printer driver 33 determines whether "Create form file" is included in the overlay setup obtained at step S401.

When it is determined at step S403 that "Create form file" was selected, the processing advances to step S405.

When it is determined at step S403 that "Create form file" was not selected, the processing is shifted to step S404.

At step S404, the printer driver 33 determines whether "Overlay printing" is included in the overlay setup data obtained at step S401.

When it is determined at step S404 that "Overlay printing" was selected, the processing advances to step S406.

When it is determined at step S404 that "Overlay printing" was not selected, the processing is terminated.

At step S405, the printer driver 33 performs the following process. The printer driver 33 generates a printer control command that includes: the file name of form data, entered in a data name input portion 301 (obtained at step S401); and a command to register form data, and then transmits the printer control command to the printing apparatus 1500.

The control program 15 for the printing apparatus 1500 receives and translates the printer control command. Thereafter, the processing shown in FIG. 8, which will be described later, is performed.

At step S406, the printer driver 33 performs the following process. The printer driver 33 generates a printer control command that includes three elements: the "file name" and the "storage date and time" for form data, entered by the user in the data name input portion 301 in FIG. 3, and the "Overlay printing" command. The printer driver 33 then transmits the printer control command to the printing apparatus 1500.

The printer control command also includes contents data, which is print data obtained by synthesizing form data.

The control program 15 receives and translates the printer control command. Thereafter, the processing shown in FIG. 7, which will be described later, is performed.

Figure 5:
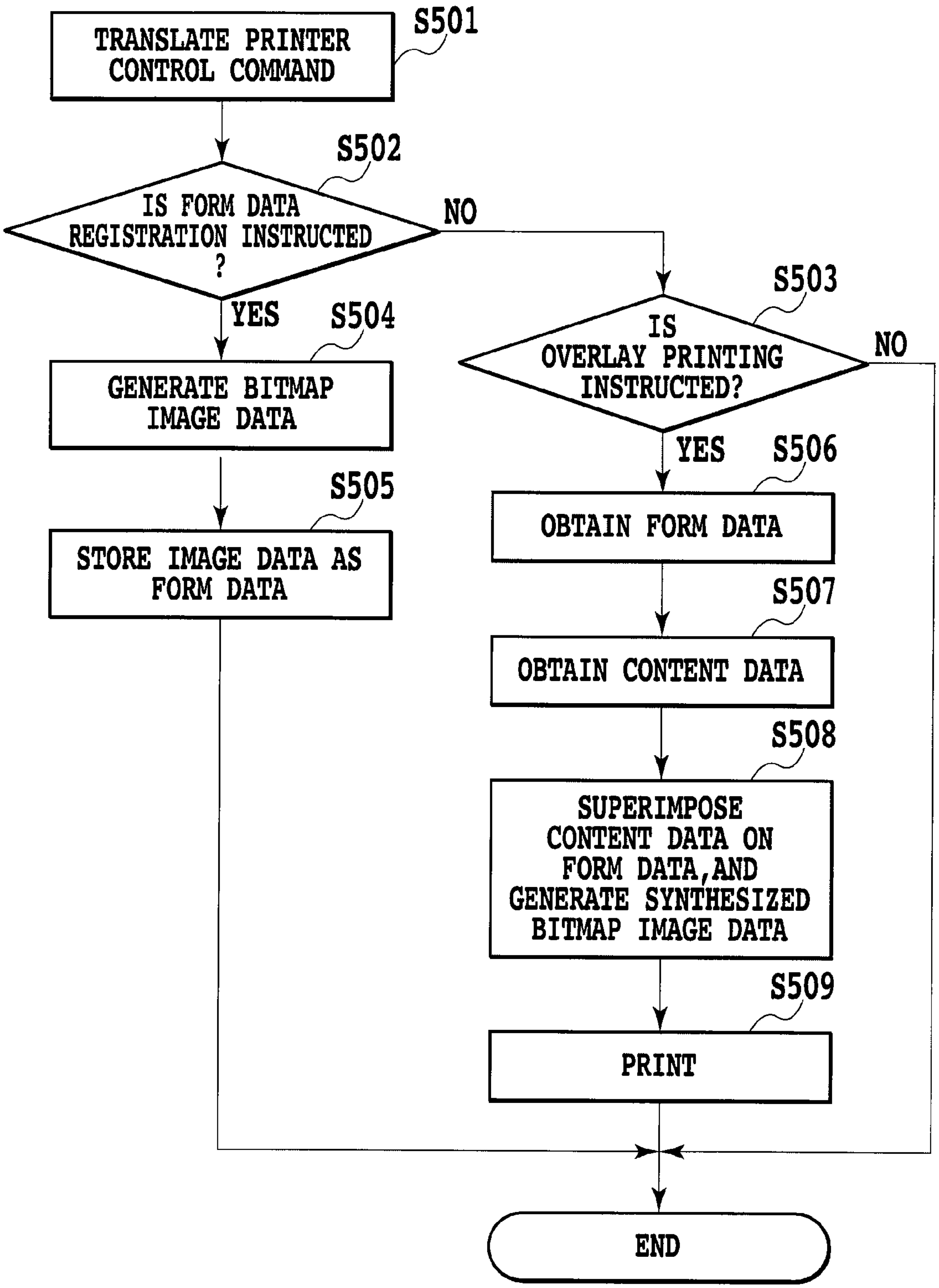
FIG. 5 is a flowchart showing the operation performed when a printing apparatus receives a printer control command.

FIG. 5 is a flowchart showing the operation performed by the control program 15 upon receiving a printer control command that includes a command to register form data, or that includes a command to perform overlay printing.

At step S501, the control program 15 translates the received printer control command.

At step S502, the control program 15 determines whether the printer control command includes a command to register form data.

When it is determined at step S502 that a command to register form data is not included, the processing is shifted to step S503.

When it is determined at step S502 that a command to register form data is included, the processing advances to step S504.

At step S503, the control program 15 determines whether the printer control command includes a command to perform overlay printing.

When it is determined at step S503 that a command to perform overlay printing is not included, the processing is terminated.

When it is determined at step S503 that a command to perform overlay printing is included, the processing advances to step S506.

At step S504, the control program 15 generates form data using a bitmap data form.

At step S505, the control program 15 stores, on the hard disk 8, the bitmap form data (reiteration of form data).

At step S506, the control program 15 performs the following process. The control program 15 refers to the form name and the storage date and time, included in the printer control command, and obtains the pertinent form data from the hard disk 8.

At step S507, the control program 15 extracts content data to be synthesized with the form data, and transmits the content data to the rendering unit 16. The rendering unit 16 then converts the content data into data having a bitmap data form, and transmits the bitmap data to the control program 15.

At step S508, the control program 15 superimposes the bitmap form data, stored at step S505, on the bitmap content data received from the rendering unit 16 (overlaying and synthesizing). In this manner, the control program 15 generates synthesized image data having a bitmap data form.

At step S509, the printing apparatus 1500 transmits, to the printing unit 11, the synthesized bitmap image data obtained at step S508. In this manner, the overlay printing function is provided, and in this case, the synthesized bitmap image data is printed by the printing unit 11.

Figure 6:
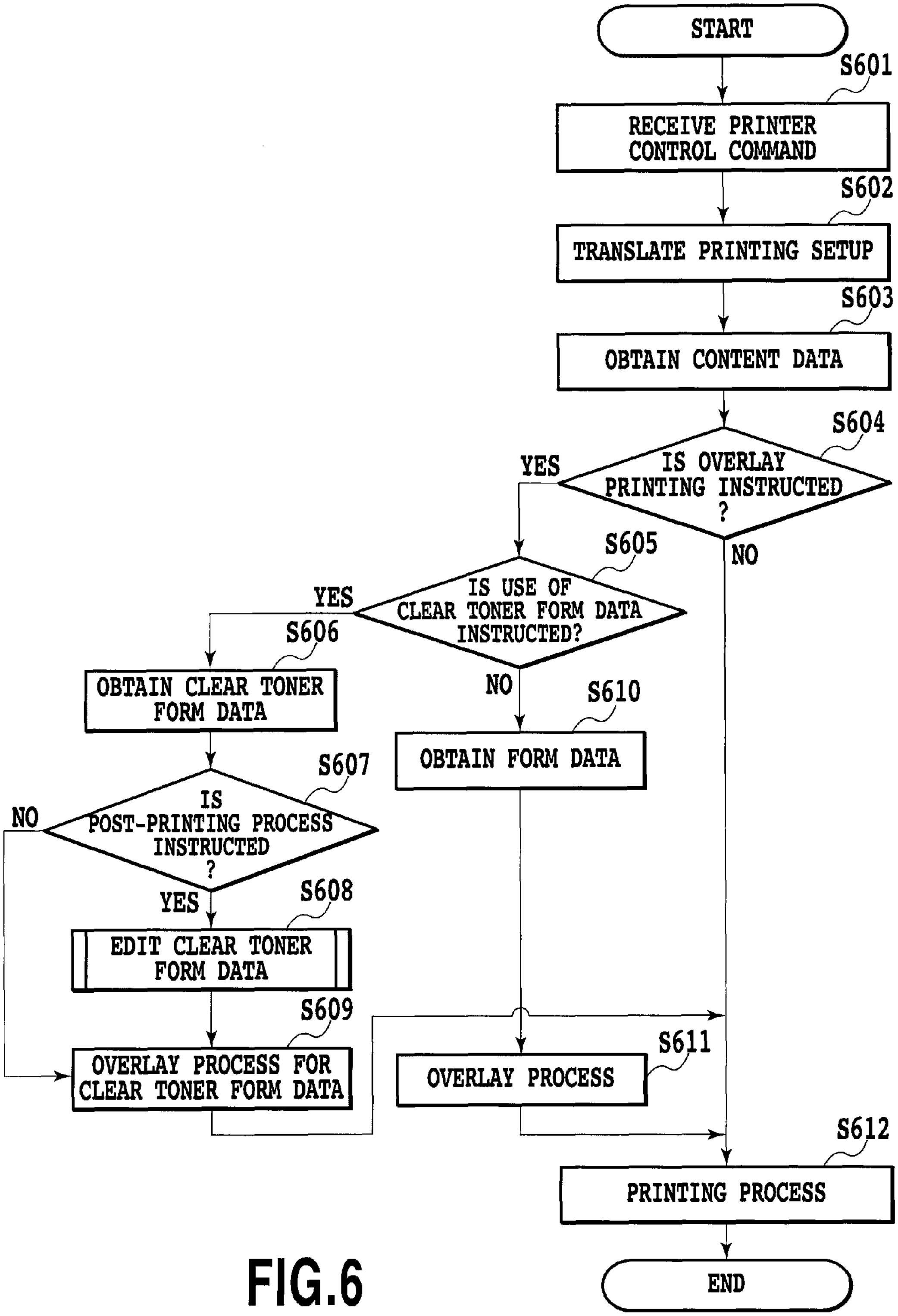
FIG. 6 is a flowchart showing the processing performed in the first embodiment when clear toner form data is to be edited in order to locally cancel the clear toner overlay printing.

FIG. 6 is a flowchart showing the following processing performed for the first embodiment, i.e., the processing performed, for editing clear toner form data, when an area (a post-processing area) for which a post-printing process is required and an area (a clear toner area) in which a clear toner is to be applied overlap each other on a print sheet, for which the overlay printing of clear toner is to be performed. This processing is performed to locally cancel the clear toner overlay printing process.

The post-printing processing indicates a process to be performed after the printing unit 11 of the printing apparatus 1500 has completed printing. Specifically, the post-printing process includes processes other than the image printing process, such as the stapling, punching and folding of paper, that are to be performed for a print sheet.

At step S601, the printing apparatus 1500 receives a printer control command created by the printer driver 33 of the host computer 3000. As described above, a printer control command created by the printer driver 33 includes the following information: a method for performing overlay printing; information related to form data stored on the hard disk 8 of the printing apparatus 1500; and content data to be employed for overlay printing.

At step S602, the control program 15 of the printing apparatus 1500 translates the printer control command received at step S601, and obtains a printing process method. Specifically, the control program 15 obtains a printer selection (e.g., a printer name), a printing mode selection (e.g., single-sided printing or double-sided printing), and a post-printing process selection (e.g., stapling, punching or paper folding, and the position at which to perform this process).

Sequentially, at step S603, the control program 15 of the printing apparatus 1500 obtains the content data from the printer control command received at step S601. The control program 15 transmits the obtained content data to the rendering unit 16. The rendering unit 16 then converts the convent data into bitmap data, and transmits the bitmap data to the control program 15. When a command designating the performance of the post-printing process is included in the printing process method translated at step S602, during the rendering process, the location of the content data is corrected, in order to ensure that the content data does not overlap the post-processing area. Specifically, when a bookbinding process, for example, is designated as the post-printing process, first, content data is moved to a position in a content data printing area where stapling or paper folding is not to be performed, and thereafter, rendering is performed for the content data. As a result, the content data is arranged so that it is positioned, for printing, at a location on the print sheet that is easy to read.

Following this, at step S604, the control program 15 of the printing apparatus 1500 translates the printer control command received at step S601 to determine whether the printer control command includes a command designating the performance of overlay printing.

When it is determined at step S604 that the printer control command received at step S601 includes a command designating the performance of overlay printing, the following processing is performed.

At step S605, the control program 15 of the printing apparatus 1500 employs form relevant information included in the command to determine whether form data employed for overlay printing is clear toner form data.

When it is determined at step S605 that the form data employed for overlay printing is not clear toner form data, the processing advances to step S610. At step S610, the control program 15 of the printing apparatus 1500 refers to the form name and the storage date and time, included in the command, and obtains the pertinent form data stored on the hard disk 8.

At step S611, the control program 15 of the printing apparatus 1500 superimposes the content data obtained at step S603 on the form data obtained at step S610 (overlaying and synthesizing). In this manner, the control program 15 of the printing apparatus 1500 generates synthesized image data having a bitmap form.

When it is determined at step S605 that the form data employed for overlay printing is clear toner form data, the following processing is performed.

At step S606, the control program 15 of the printing apparatus 1500 refers to the form name and the storage date and time, included in the command, and obtains the pertinent clear toner form data stored on the hard disk 8.

At step S607, the control program 15 of the printing apparatus 1500 determines whether the printing process method translated at step S602 includes a command designating the performance of a post-printing process.

When it is determined at step S607 that the printing process method translated at step S602 includes a command designating a post-printing process, the processing advances to step S608.

When it is determined at step S607 that the printing process method translated at step S602 does not include a command designating a post-printing method, the processing is shifted to step S609.

At step S608, the control program 15 of the printing apparatus 1500 translates the contents of the post-printing process. Thereafter, the control program 15 of the printing apparatus 1500 obtains information, included in the printer control command, for the contents of the post-printing process and for the position, on the print sheet, at which the post-printing process is to be performed, and edits the clear toner form data as needed.

Figure 7:
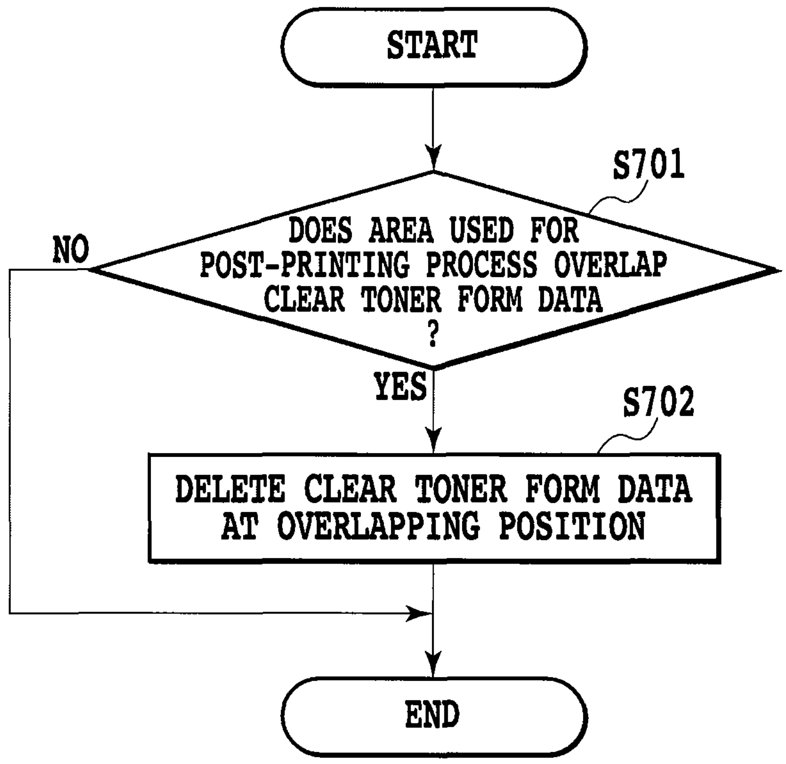
FIG. 7 is a flowchart showing the processing for editing clear toner form data.

The details of the process at step S608 are shown at steps S701 and S702 in FIG. 7.

Specifically, FIG. 7 is a flowchart showing the clear toner form data editing processing performed when the overlay printing process employing clear toner form data and the post-printing process are selected.

At step S701, in accordance with the selected post-printing process included in the printer control command, the control program 15 of the printing apparatus 1500 analyzes a position on a print sheet where the post-printing process is to be performed, and obtains information for the performance of the post-printing process at that location, i.e., obtains the post-processing area. Then, the control program 15 of the printing apparatus 1500 determines whether there is an area where the clear toner area and the post-processing area overlap.

When it is determined at step S701 that there is no area where the clear toner area and the post-processing area overlap, the control program 15 of the printing apparatus 1500 ascertains that printing using clear toner is not to be performed for the post-processing area. Thereafter, the process at step S608 is terminated.

When it is determined at step S701 that there is an area where the clear toner area and the post-processing area overlap, the control program 15 of the printing apparatus 1500 ascertains whether printing employing clear toner is to be performed for the post-processing area. Then, the processing advances to step S702.

Figure 8:
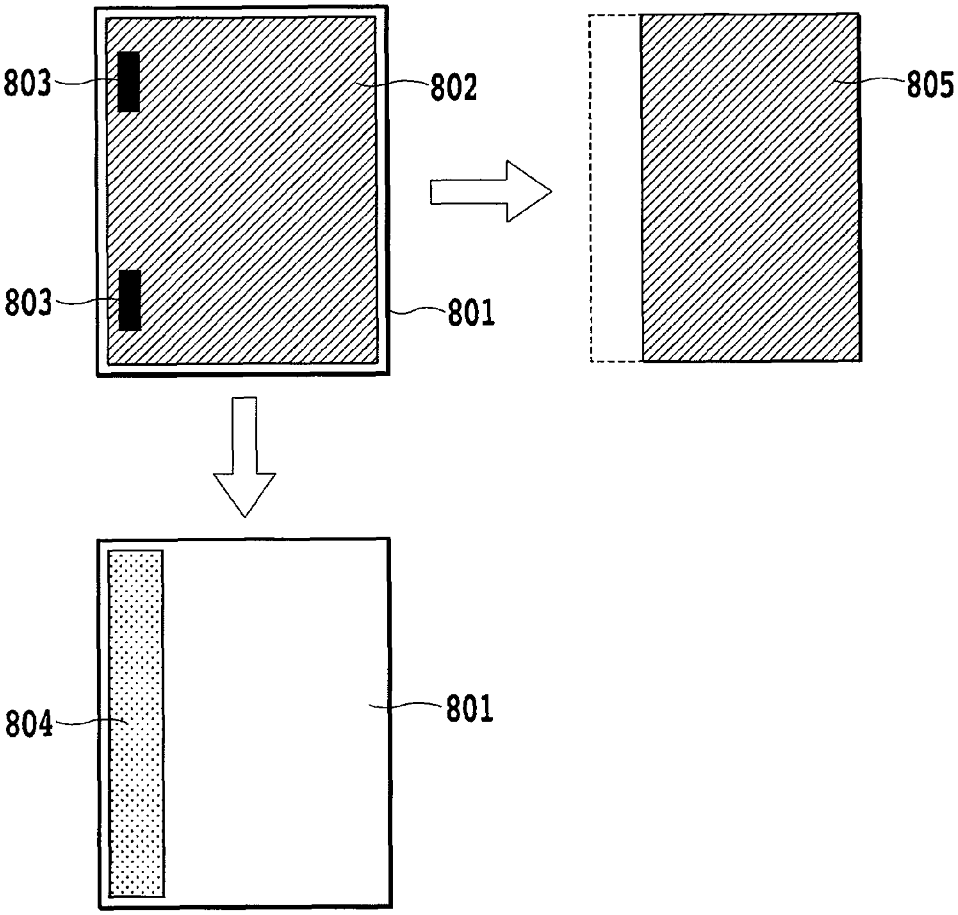
FIG. 8 is a diagram illustrating example clear toner data forms of the first embodiment before and after the clear toner form data has been edited.

FIG. 8 is a diagram illustrating clear toner form data for which the editing process is to be performed at step S608.

An overlay printing instruction is included in the printer control command that is received at step S601 and is translated by the control program 15 of the printing apparatus 1500. Specifically, the printer control command includes an instruction to perform overlay printing for clear toner form data 802, obtained at step S606, across the entire face of a print sheet 801. At this time, it is also assumed that the printer control command includes an instruction designating a post-printing process for the fastening of the left edge of the print sheet 801 using staples 803.

Based on the result of the process at step S701, the control program 15 obtains an area on the print sheet 801 whereat the clear toner form data 802 is to be provided, and also, based on the selected stapling process included in the printer control command, obtains the post-processing area in which the staples 803 are to be applied. Thus, the control program 15 regards as an overlap area 804, the area of the print sheet 801 in which the clear toner form data 802 is to be provided and the area of the print sheet 801, the post-processing area, in which the staples 803 are to be applied.

At step S702, the control program 15 deletes the clear tone form data 802 for an area having a size equivalent to that of the overlap area 804 obtained at S701, so that the clear toner form data 802 does not cover the overlap area 804. In this manner, the control program 15 generates edited clear toner form data 805 such that the post-processing area and the clear toner form data area do not overlap.

As shown in the edited clear toner form data 805 positions to be printed on print sheet by the clear toner are indicated by the form data.

At step S603, the control program 15 changes the content data printing area in order for printed matter to be seen more easily.

Further, at step S702, the control program 15 changes the size of the clear toner processing area so that printed matter can more easily be handled.

Specifically, during bookbinding, an area in which a saddle stitch portion and a folded portion overlap is obtained, and the clear toner application process is canceled for this overlap area (i.e., in this area clear toner is not applied to the print sheet). Or rather, the clear toner processing (the process by which the print sheet is coated with clear toner) is performed for the entire surface of the print sheet, except for the overlap area. The process for printing content data using non-transparent color material (the process for applying a non-transparent color material to the print sheet) is performed for a specific area of the print sheet. Therefore, in the first embodiment, the clear toner process area always covers the content data area, and the usability of printed material for which the post-printing process is performed is improved. The interval between the area for which the post-printing processing is performed and the area on which the clear toner is applied may be smaller than the area in which the content data are printed. Further, the area of a printed sheet that is coated with clear toner (a transparent color material) may be larger than the area of the printed sheet within which a non-transparent color material is applied.

Following this, at step S609 in FIG. 6, the control program 15 superimposes on the content data obtained at step S603 the clear toner form data obtained at step S606, or the clear toner form data edited at step S608. Then, the control program 15 employs the superimposed (overlaid or synthesized) data to generate synthesized image data in a bitmap form.

At step S612, the control program 15 transmits to the printing unit 11 the image data generated at step S604, the synthesized image data generated at step S611 and the synthesized image data generated at step S609, and initiates the printing process.

Figure 9:
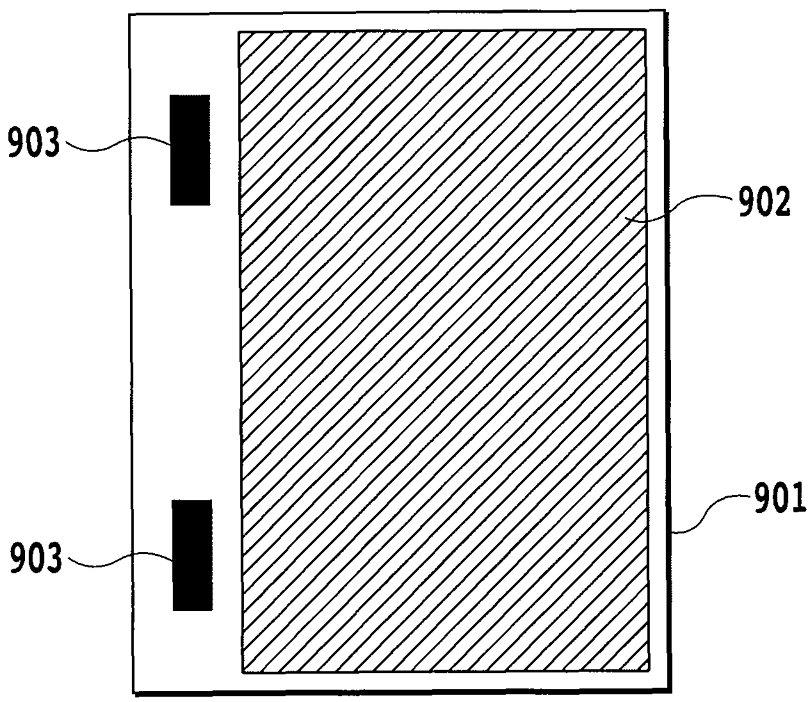
FIG. 9 is a diagram illustrating an example printing result obtained for this embodiment when an overlay printing process and a stapling process were performed using the clear toner form data that has been edited.

FIG. 9 is a diagram illustrating example printing results, obtained by the first embodiment, when the overlay printing and stapling processes have been performed while the clear toner form data, edited at step S608, is employed.

As a result of the process performed at step S608, overlay printing is provided for a print sheet 901, while the size of a clear toner area 902 is reduced and an overlapping of clear toner form data, from the area in which staples 903 are going to be employed, is avoided.

In the first embodiment, overlay printing of clear toner form data is locally canceled for an area in which a post-printing process, such as stapling, punching or folding, is to be employed. Since the setup for the post-printing process is translated and clear toner form data is automatically edited, even when the clear toner process is performed for the entire print sheet, including the portion to be stapled, punched or folded, the printing results obtained through the clear toner process permit all portions of the print sheet to be easily folded.

Other Embodiment

The scope of the above described embodiment also includes a processing method whereby a program that employs the configuration of the embodiment is stored on a storage medium to perform the functions of the embodiment, and whereby the program is read as code from the storage medium and is executed by a computer. Furthermore, not only is the storage medium on which this program is stored included in the above described embodiment, but also the program is included in the above described embodiment.

A storage medium such as the one above can, for example, be a floppy disk, a hard disk, an optical disk, a magneto-optical disk, a CD-ROM, a magnetic tape, a nonvolatile memory card or a ROM.

In addition, the scope of this embodiment also includes a single program, stored on the above described storage medium, that performs the processing, but also a program that is operated by an OS, in cooperation with other software application or an inherent function of an extension board, to perform the function of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-014209, filed Jan. 24, 2008, which is hereby incorporated by reference herein in its entirety.

What is claimed is:

1. A printing system including a printing apparatus and a host computer connected with the printing apparatus, the host computer comprising:

a registering unit that registers first form data, which indicates a first area that a transparent coloring material is to be superimposed on content data, and second form data, different from the first form data, which indicates a second area that the transparent coloring material is to be superimposed on content data;

an input unit that inputs a first identifier which identifies the first form data registered by said registering unit and a second identifier, different from the first identifier, which identifies the second form data registered by said registering unit; and a selection unit that allows a user to select one of the first form data and the second form data, wherein image forming with the transparent coloring material is based on the selected form data, and the printing apparatus comprising:

a printing unit that prints an image using the transparent coloring material on the area indicated by the one of the first form data and the second form data which is selected by said selection unit, wherein the image is superimposed on the content data.

2. The printing system according to claim 1, wherein the host computer further comprises:

a display unit that displays the first identifier and the second identifier, wherein said selection unit allows the user to select the form data using the identifier displayed on said display unit.

3. The printing system according to claim 1, wherein the printing apparatus further comprises:

an obtaining unit that obtains information related to a setting of a post-printing process to be performed on a print sheet on which the image is to be printed by said printing unit;

a determining unit that determines whether there is overlap between 1) a first printing area on the print sheet, wherein the first printing area is indicated by the form data selected by the user from the one of the first form data and the second form data, and 2) a second printing area on the print sheet, wherein the second printing area on the print sheet is an area on which the post-printing process is required based on the setting of the post-printing process obtained by said obtaining unit; and a deleting unit that deletes an overlapping area, conforming to the superimposition of the transparent coloring material, of the selected form data when said determining unit determines that the first printing area and the second printing area overlap.

4. The printing system according to claim 3, wherein the setting of the post-printing process includes a setting for stapling, punching, or paper folding to be performed on the print sheet on which said printing unit prints the image.

5. The printing system according to claim 1, wherein the area indicated by the selected form data is larger than an area in which the content data is printed.

6. A printing method, comprising:

registering first form data, which indicates a first area that a transparent coloring material is to be superimposed on content data, and second form data, different from the first form data, which indicates a second area that the transparent coloring material is to be superimposed on content data;

inputting a first identifier which identifies the first form data registered in said registering step and a second identifier, different from the first identifier, which identifies the second form data registered in said registering step;

selecting one of the first form data and the second form data, wherein image forming with the transparent coloring material is based on the selected form data; and printing an image using the transparent coloring material on the area indicated by one of the first form data and the second form data selected by the selecting step, wherein the image is superimposed on the content data.

7. The printing method according to claim 6, further comprising:

displaying the first identifier and the second identifier, wherein said selecting step allows a user to select the form data using the identifier displayed in said displaying step.

8. The printing method according to claim 6, further comprising:

obtaining information related to a setting of a post-printing process to be performed on a print sheet on which the image is to be printed in said printing step;

determining whether there is overlap between 1) a first printing area on the print sheet, wherein the first printing area is indicated by the form data selected from one of the first form data and the second form data, and 2) a second printing area on the print sheet, wherein the second printing area on the print sheet is an area on which the post-printing process is required based on the setting of a post-printing process obtained in said obtaining step; and deleting an overlapping area, conforming to the superimposition of the transparent color material, of the selected form data when said determining step determines that the first printing area and the second printing area overlap.

9. The printing method according to claim 8, wherein the setting of the post-printing process includes a setting for stapling, punching, or paper folding to be performed on the print sheet on which the image is printed in said printing step.

10. The printing method according to claim 6, wherein the area indicated by the selected form data is larger than an area in which the content data is printed.

11. A non-transitory computer-readable storage medium storing a program that causes a computer to execute each step of the printing method according to claim 6.

12. A printing apparatus that prints an image on a print sheet, comprising:

an obtaining unit that obtains 1) information related to a setting of a post-printing process to be performed on the print sheet and 2) information related to a first printing area on the print sheet in which a transparent coloring material is to be superimposed on content data;

a determining unit that determines whether the first printing area on the print sheet overlaps with a second printing area on the print sheet, wherein the second printing area on the print sheet is an area on which the post-printing process is required based on the setting of the post-printing process obtained by said obtaining unit; and a deleting unit that deletes a portion of the first printing area that corresponds with an overlapping area of the first printing area and the second printing area when said determining unit determines that the first printing area and the second printing area overlap.

13. A host computer connected with printing apparatus, the host computer comprising:

a registering unit that registers first form data, which indicates a first area that a transparent coloring material is to be superimposed on content data, and second form data, different from the first form data, which indicates a second area that the transparent coloring material is to be superimposed on content data;

an input unit that inputs a first identifier which identifies the first form data registered by said registering unit and a second identifier, different from the first identifier, which identifies the second form data registered by said registering unit;

a selection unit that allows a user to select one of the first form data and the second form data, wherein image forming with the transparent coloring material is based on the selected form data; and a transmitting unit that transmits the selected form data and the content data to the printing apparatus.

* * * * *